United States Patent
Campbell et al.

(10) Patent No.: US 6,683,793 B1
(45) Date of Patent: Jan. 27, 2004

(54) DISTRIBUTED SCALABLE BACKPLANE

(75) Inventors: James P. Campbell, Mead, CO (US); Bernard A. Johnson, Broomfield, CO (US); Donald Robert Manes, Arvada, CO (US); Kenneth Lee Manes, Brighton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/319,036

(22) Filed: Dec. 13, 2002

(51) Int. Cl.[7] ............... H05K 7/02; H05K 7/18; H05K 7/14; H02B 1/21
(52) U.S. Cl. ............... 361/796; 361/788; 361/826; 361/729; 361/730; 211/41.17
(58) Field of Search ............... 361/796–798, 361/826, 788, 728, 729, 730, 752; 174/50; 211/41.17

(56) References Cited

U.S. PATENT DOCUMENTS

| | | | | |
|---|---|---|---|---|
| 5,122,691 A | * | 6/1992 | Balakrishnan | 307/475 |
| 5,903,442 A | * | 5/1999 | Kanai et al. | 361/788 |
| 5,909,357 A | * | 6/1999 | Orr | 361/687 |
| 5,991,852 A | * | 11/1999 | Bagley | 711/112 |
| 6,469,901 B1 | * | 10/2002 | Costner | 361/730 |
| 6,496,366 B1 | * | 12/2002 | Coglitore et al. | 361/687 |
| 2002/0018339 A1 | * | 2/2002 | Uzuka et al. | 361/796 |

* cited by examiner

Primary Examiner—David Martin
Assistant Examiner—Dameon E. Levi
(74) Attorney, Agent, or Firm—Carstens, Yee & Cahoon, LLP

(57) ABSTRACT

A backplane is disclosed for attaching storage devices to the backplane that utilize removable media. The backplane is distributed and scalable. The backplane includes a generally horizontal portion for distributing electronic signals to the storage devices and a plurality of connectors coupled to said generally horizontal portion for receiving the storage devices. The storage devices are coupled to the backplane utilizing the generally horizontal portion. The storage devices are not coupled to the backplane utilizing a front or a back of any one of the storage devices such that the front and back of each storage device remain accessible when the storage devices are coupled to the backplane.

19 Claims, 5 Drawing Sheets

DISTRIBUTED SCALABLE BACKPLANE

BACKGROUND OF THE INVENTION

1. Field of the Invention

The present invention relates to a backplane for attaching storage devices, and more particularly to a distributed, scalable backplane for attaching storage devices that utilize removable media.

2. Background of the Invention

In scalable disk array systems, a backplane is used to attach many disk drives together. This backplane serves as a means for distributing power, data, and controls to each disk drive. This prior art backplane is a single physical device throughout which all of the power, data, and controls are distributed. The backplane is typically a single motherboard which is physically similar to a wall, where the disk drives are attached to one side of the wall. This physical arrangement is possible because disk drives need access to only one side of the backplane in order to be installed in and removed from the backplane. All power, data, and controls are routed to each drive using the single motherboard backplane.

FIG. 1 is a block diagram of disk drives attached to a single motherboard backplane in accordance with the prior art. Backplane 10 is a single motherboard backplane to which disk drives 12, 14, and 16 are attached. A front 18 of the disk drives is accessible. However, when attached to backplane 10, the back 20 of the disk drives is no longer accessible.

Further, as is depicted, backplane 10 is not scalable. Backplane 10 can accommodate only a particular number of drives. Additional disk drives may not be attached to backplane 10 once this particular number is attached.

Removable media storage devices, unlike disk drives, require access to both the front and back of the devices. For example, a tape automation system includes an array of tape drives that each have removable tape cartridges. In a tape automation system, a robot must have access to a front of the tape drives in order to insert and remove the tape cartridges. The back of the tape drives must also remain accessible to service personnel who need full access to the I/O side of the drive. In addition, airflow must be permitted to travel from the front of a tape drive to the back of the drive.

Therefore, a single motherboard backplane is not practical for removable media drive array systems. A single motherboard backplane would block access to the slot for inserting and removing media.

SUMMARY OF THE INVENTION

A backplane is disclosed for attaching storage devices to the backplane that utilize removable media. The backplane is distributed and scalable. The backplane is divided into separate generally horizontal portions that each support a row of removable media storage devices. Each generally horizontal portion includes a bus for distributing electronic signals to the storage devices that are coupled to that generally horizontal portion. Each generally horizontal portion includes multiple connectors coupled to the generally horizontal portion for receiving the storage devices. The storage devices are not coupled to the backplane utilizing a front or a back of any one of the storage devices such that the front and back of each storage device remain accessible when the storage devices are coupled to the backplane.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

Figure 1:
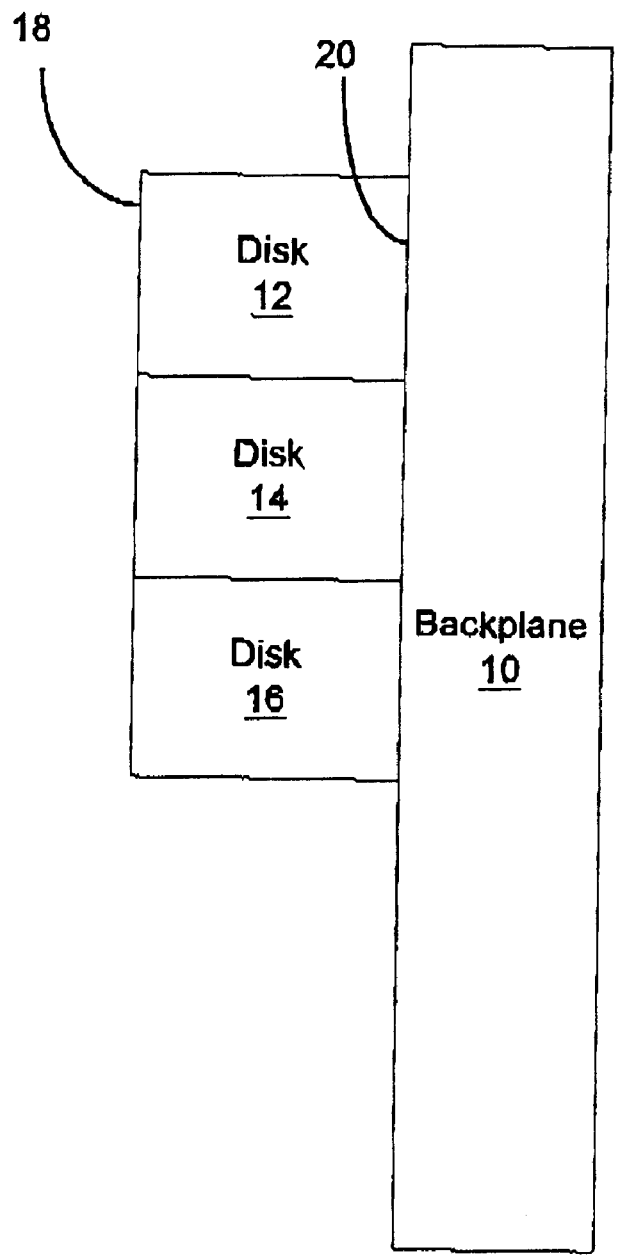
FIG. 1 is a block diagram of disk drives attached to a single motherboard backplane in accordance with the prior art.
Figure 2:
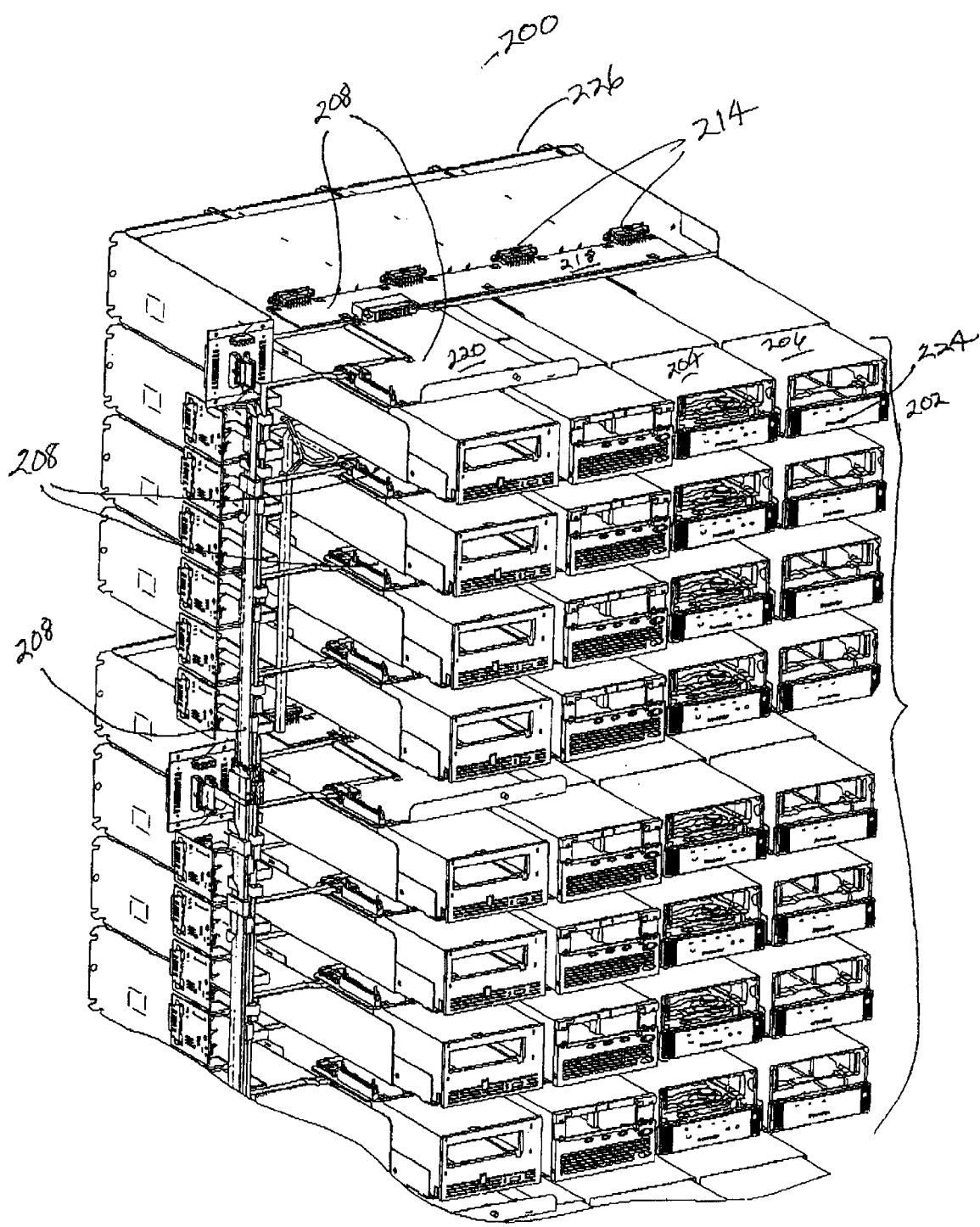
FIG. 2 is a front perspective view of an array of tape drives attached to a distributed, scalable backplane in accordance with the present invention.
Figure 3:
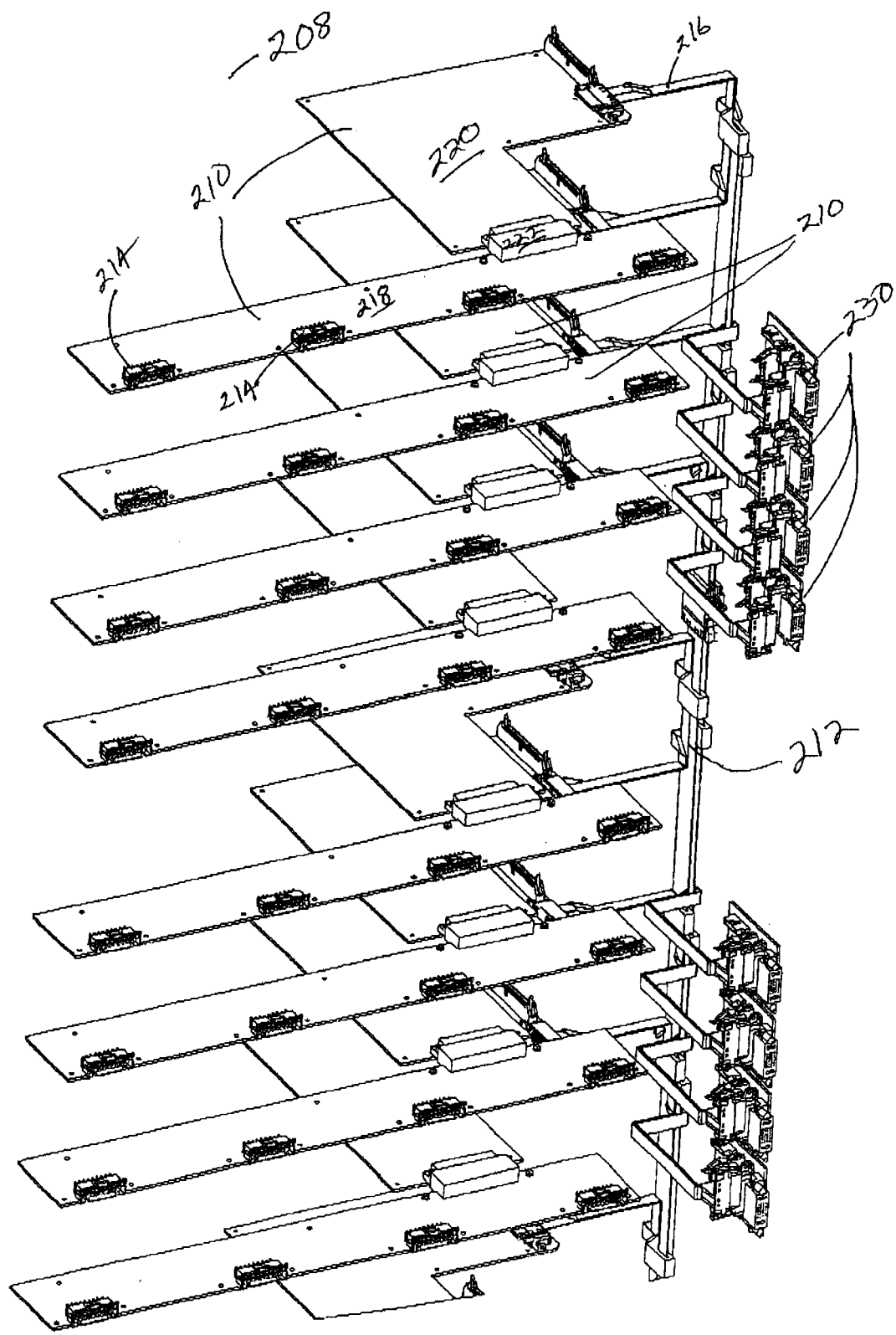
FIG. 3 is a back perspective view of a distributed, scalable backplane in accordance with the present invention.

FIG. 2 is a front perspective view of a tape automation system 200 that includes an array 202 of tape drives, such as drives 204, 206, attached to a distributed, scalable backplane 208 in accordance with the present invention. FIG. 3 is back perspective view of distributed, scalable backplane 208 in accordance with the present invention.

Referring now to FIGS. 2 and 3, backplane 208 includes a plurality of generally horizontal portions 210, and a generally vertical portion 212 which couples the generally horizontal portions together. A bussed cabling system is included within these generally horizontal and generally vertical portions for distributing electronic signals, including data and control signals as well as power. As used herein, "horizontal portion" and "vertical portion" are used to mean both the physical device as well as the electronic cabling bus system.

In addition, the terms "horizontal" and "vertical" are used herein to provide an orientation for the portions of backplane 208. However, those skilled in the art will recognize that backplane 208 may be implemented using non-horizontal and/or non-vertical portions.

Each generally horizontal portion 210 includes a plurality of connectors 214 for coupling generally horizontal portion 210 to a storage device. A bus 216 is included within each generally horizontal portion 210 and generally vertical portion 212 for transmitting electronic signals, such as data, power, and control signals.

In accordance with a preferred embodiment, each generally horizontal portion 210 includes a rectangular printed wiring assembly (PWA) portion 218 and an L-shaped interface (I/F) card portion 220 coupled together utilizing a connector 222. Of course those skilled in the art will recognize that each generally horizontal portion may be formed from a single material in any suitable shape, quantity, and/or any three-dimensional orientations.

Each storage device is attached to backplane 208 utilizing one of the connectors 214. In the preferred embodiment, each storage device is attached to backplane 208 utilizing the top of each storage device. In this manner, both the front, such as front 224 and the back, such as back 226, of each storage device remain accessible. Therefore, a row of storage devices are suspended from each generally horizontal portion 210.

Backplane 208 is capable of receiving power from a power supply array that attaches to backplane 208 utilizing a plurality of power supply interface cards 230. Each interface card 230 is capable of receiving a power supply. Power is supplied to backplane 208 via this array of power supplies. The array acts as a single source of power to the backplane such that there is not a one-to-one correspondence between power supplies and storage devices. Each interface card 230 is coupled to bus 216, preferably via generally vertical portion 212.

Thus, in accordance with the present invention, a backplane has been separated into pieces which have been placed horizontally between each row of storage devices. This provides access to both the front and back of each storage device. This backplane also permits economic scalability for further expansion. Each time a row of storage devices is added to the array, another generally horizontal portion, including the cabling bus, may be added to the backplane.

Figure 4:
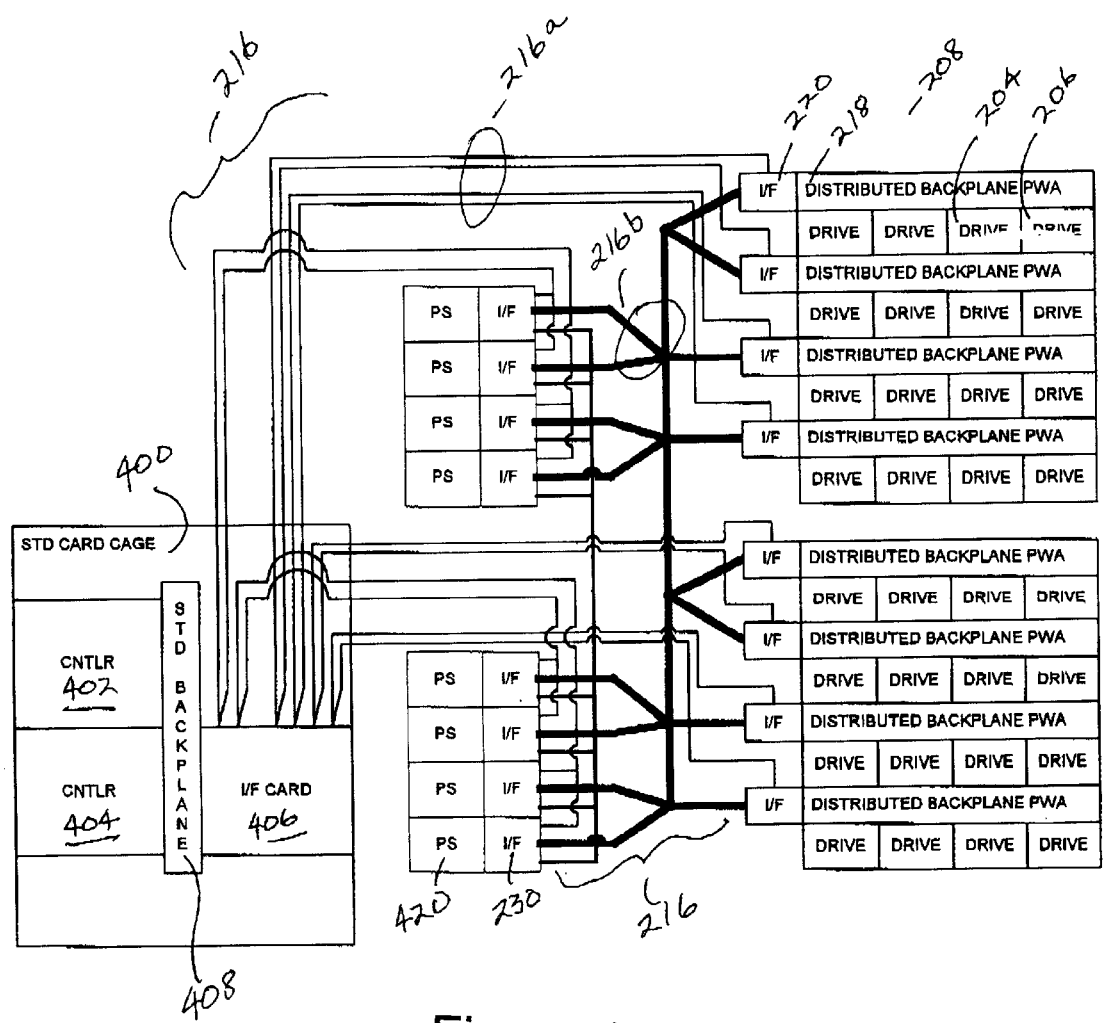
FIG. 4 is a block diagram of an array of removable media storage devices attached to a distributed, scalable backplane in accordance with the present invention.

FIG. 4 is block diagram of an array of removable media storage devices attached to a distributed, scalable backplane in accordance with the present invention. A card cage 400 may be electronically and physically coupled to backplane 208. Card cage 400 includes a controller 402, a controller 404 and an interface card 406 coupled to a standard backplane 408 within card cage 400. Interface card 406 is coupled to bus 216 and may transmit electronic signals to backplane 208 utilizing bus 216. Bus 216 is coupled to interface cards 220 which receive the signals and transmit them to each distributed backplane PWA 218. Bus 216 distributes data and control signals via lines 216a while it distributes power via lines 216b.

Each power supply (PS) is coupled to an interface card which is in turn coupled to power lines 216b. For example, power supply (PS) 420 is coupled to lines 216b via interface card (I/F) 230.

As is illustrated by FIG. 4, backplane 208 includes a backplane PWA 218 for each row of drives. Because backplane 208 is divided into multiple generally horizontal portions, the front and back of the storage devices remain accessible.

Additional rows of storage devices may easily be added by adding additional generally horizontal portions of backplane 208 and extending bus 216.

Figure 5:
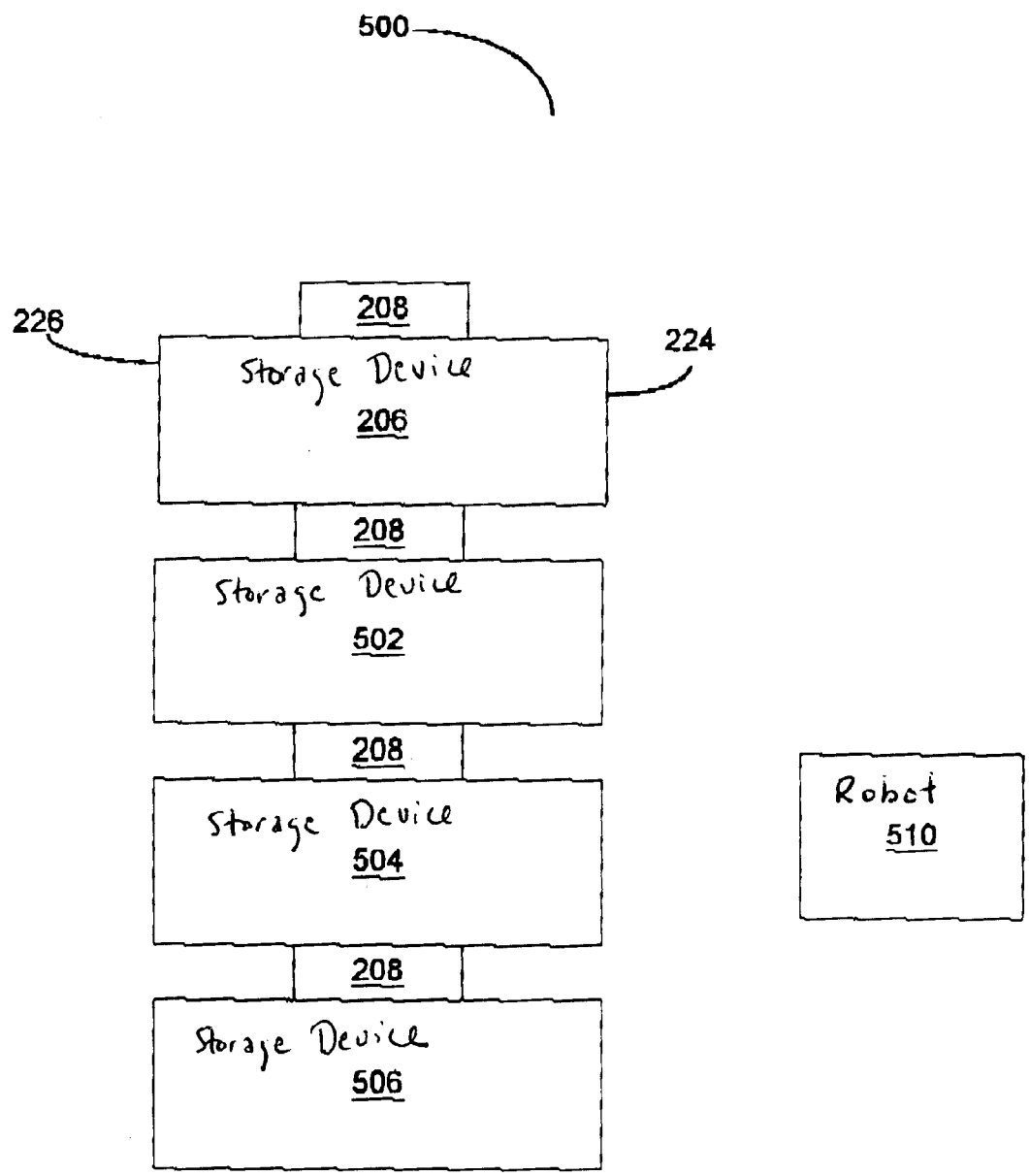
FIG. 5 is a side view of a tape automation system including a distributed, scalable backplane in accordance with the present invention.

FIG. 5 is a side view of a tape automation system 500 including a distributed, scalable backplane 208 in accordance with the present invention. System 500 includes storage devices 206, 502, 504, and 506 attached to a distributed backplane 208. The front of each storage device, such as front 224 of device 206, is accessible, such as to a robot 510. The back of each storage device, such as back 226 of device 206, is also accessible. Therefore, the back of the devices is accessible, such as for service, while the front remains accessible to a user or robot that needs to insert and remove tape cartridges.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus including a backplane for securing storage devices, said apparatus comprising:
   a generally horizontal portion for distributing electronic signals to said storage devices;
   a plurality of connectors coupled to said generally horizontal portion for receiving said storage devices; and
   said storage devices being coupled to said backplane utilizing said generally horizontal portion, and
   not utilizing a front or a back of any one of said storage devices, and wherein said front and said back of each one of said storage devices remain accessible when said storage devices are coupled to said backplane.

2. The apparatus of claim 1, wherein said storage devices utilize removable media.

3. The apparatus of claim 1, wherein said storage devices are tape drives.

4. The apparatus of claim 1, wherein:
   said storage devices utilize removable media;
   said front of each one of said storage devices remains accessible such that said removable media is accessible while said storage devices are coupled to said backplane; and
   said back of each one of said storage devices remains accessible such that service may be provided to said back of each one of said storage devices while said storage devices are coupled to said backplane.

5. The apparatus of claim 1, wherein said generally horizontal portion distributes data, power, and control signals to said storage devices.

6. The apparatus of claim 1, further comprising:
   each one of said storage devices including a connector on a top of each one of said storage devices;
   said plurality of connectors coupled to said generally horizontal portion for receiving said connector included on said top of each one of said storage devices; and
   said generally horizontal portion for holding said storage devices from said top of said storage devices such that said storage devices are suspended from said generally horizontal portion.

7. The apparatus of claim 1, further comprising:
   an array of storage devices including:
      a plurality of rows of storage devices; and
      a plurality of said generally horizontal portions, each one of said plurality of said generally horizontal portions securing a different one of said plurality of rows of storage devices.

8. The apparatus of claim 7, further comprising:
   a generally vertical portion for coupling said plurality of said generally horizontal portions together, said generally vertical portion for transmitting said signals between said plurality of said generally horizontal portions and a card cage.

9. The apparatus of claim 1, wherein:
   each one of said plurality of said generally horizontal portions includes an electronic bus for distributing said signals; and
   said generally vertical portion includes said electronic bus.

10. The apparatus of claim 9, further comprising:
an array of power supplies coupled to said electronic bus utilizing said generally vertical portion.

11. The apparatus of claim 10, wherein:
said array of power supplies provides a single source of power to all of said plurality of storage devices; and
there is no one-to-one correspondence between power supplies and storage devices.

12. An apparatus including a backplane for securing storage devices, said apparatus comprising:
a generally horizontal portion for distributing electronic signals to said storage devices;
a plurality of connectors coupled to said generally horizontal portion for receiving said storage devices, said storage devices being coupled to said backplane utilizing said generally horizontal portion, and not utilizing a front or a back of any one of said storage devices such that said front and said back of each one of said storage devices remain accessible when said storage devices are coupled to said backplane; wherein:
each one of said plurality of said generally horizontal portions includes an electronic bus for distributing said signals,
a generally vertical portion includes said electronic bus;
an array of power supplies coupled to said electronic bus utilizes said generally vertical portion; and
a plurality of power interface cards coupled to said generally vertical portion;
each one of said power supplies being coupled to said bus utilizing one of said plurality of power interface cards.

13. The apparatus of claim 7, wherein said backplane is scalable such that said backplane is capable of including a new generally horizontal portion in response to a new row of storage devices being added to said array of storage devices.

14. The apparatus of claim 1, wherein:
said front of each one of said storage devices remains accessible such that said removable media is accessible while said storage devices are coupled to said backplane; and
said back of each one of said storage devices remains accessible such that service may be provided to said back of each one of said storage devices while said storage devices are coupled to said backplane.

15. An apparatus including a backplane for securing tape drives that utilize removable tape cartridges, said apparatus comprising:
a generally horizontal portion for distributing electronic signals to said tape drives;
a plurality of connectors coupled to said generally horizontal portion for receiving said tape drives; said tape drives being coupled to said backplane utilizing said generally horizontal portion, and not utilizing a front or a back of any one of said tape drives such that said front and said back of each one of said tape drives remain accessible when said tape drives are coupled to said backplane; and
a robot for accessing said removable tape cartridges via a front of said tape drives while said tape drives are coupled to said backplane.

16. A tape automation system including a backplane for securing tape drives that have removable tape cartridges, comprising:
a plurality of different generally horizontal portions for holding a plurality of tape drives that are included in a tape drive array;
each one of said plurality of generally horizontal portions supporting one row of a plurality of tape drives included in said array;
each one of said plurality of generally horizontal portions including an electronic bus for distributing electronic signals to said plurality of tape drives that are supported by each one of said plurality of generally horizontal portions;
a plurality of connectors coupled to each one of said plurality of generally horizontal portions for receiving a different one of said plurality of tape drives;
wherein said plurality of tape drives are coupled to said backplane and not utilizing a front or a back of any one of said plurality of tape drives, and wherein said front and said back of each one of said plurality of tape drives remain accessible when said plurality of tape drives are coupled to said backplane;
a generally vertical portion for coupling said plurality of generally horizontal portions together;
said generally vertical portion including said electronic bus; and
said backplane being scalable such that said backplane is capable of including a new generally horizontal portion in response to a new row of tape drives being added to tape drive array.

17. A tape automation system including a backplane for securing tape drives that have removable tape cartridges, comprising:
a plurality of different generally horizontal portions for holding a plurality of tape drives that are included in a tape drive array,
each one of said plurality of generally horizontal portions supporting one row of a plurality of tape drives included in said array;
each one of said plurality of generally horizontal portions including an electronic bus for distributing electronic signals to said plurality of tape drives that are supported by each one of said plurality of generally horizontal portions;
a plurality of connectors coupled to each one of said plurality of generally horizontal portions for receiving a different one of said plurality of tape drives;
wherein said plurality of tape drives are coupled to said backplane and not utilizing a front or a back of any one of said plurality of tape drives such that said front and said back of each one of said plurality of tape drives remain accessible when said plurality of tape drives are coupled to said backplane;
a generally vertical portion for coupling said plurality of generally horizontal portions together;
said generally vertical portion including said electronic bus;
said backplane being scalable such that said backplane is capable of including a new generally horizontal portion in response to a new row of tape drives being added to tape drive array; and
a robot for accessing said tape cartridges via a front of said plurality of tape drives while said tape drives are coupled to said backplane.

18. The system of claim 16, further comprising:
an array of power supplies, said array of power supplies providing a single source of power to all of said plurality of tape drives.

19. A tape automation system including a backplane for securing tape drives that have removable tape cartridges, comprising:

a plurality of different generally horizontal portions for holding a plurality of tape drives that are included in a tape drive array;

each on of said plurality of generally horizontal portions supporting one row of a plurality of tape drives included in said array;

each one of said plurality of generally horizontal portions including an electronic bus for distributing electronic signals to said plurality of tape drives that are supported by each one of said plurality of generally horizontal portions;

a plurality of connectors coupled to each one of said plurality of generally horizontal portions for receiving a different one of said plurality of tape drives, wherein said plurality of tape drives are coupled to said backplane and not utilizing a front or a back of any one of said plurality of tape drives such that said front and said back of each one of said plurality of tape drives remain accessible when said plurality of tape drives are coupled to said backplane;

a generally vertical portion for coupling said plurality of generally horizontal portions together;

said generally vertical portion including said electronic bus;

said backplane being scalable such that said backplane is capable of including a new generally horizontal portion in response to a new row of tape drives being added to tape drive array;

an array of power supplies, said array of power supplies providing a single source of power to all of said plurality of tape drives; and a plurality of power interface cards coupled to said generally vertical portion, each one of said power supplies being coupled to said electronic bus utilizing one of said power interface cards.

* * * * *